(12) United States Patent
Liu et al.

(10) Patent No.: US 11,298,729 B2
(45) Date of Patent: Apr. 12, 2022

(54) SUB-FRAME CLEANING AND BLOW-DRYING DEVICE

(71) Applicant: CITIC Dicastal CO.,LTD., Qinhuangdao (CN)

(72) Inventors: Huiying Liu, Qinhuangdao (CN); Baojun Shi, Qinhuangdao (CN); Junmeng Li, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 370 days.

(21) Appl. No.: 16/676,773

(22) Filed: Nov. 7, 2019

(65) Prior Publication Data
US 2020/0384511 A1  Dec. 10, 2020

(30) Foreign Application Priority Data

Jun. 6, 2019 (CN) .......................... 201910490312.8

(51) Int. Cl.
*B08B 9/00* (2006.01)
*B08B 5/02* (2006.01)
*B62D 21/00* (2006.01)

(52) U.S. Cl.
CPC ................. *B08B 9/00* (2013.01); *B08B 5/02* (2013.01); *B62D 21/00* (2013.01); *F26B 2210/12* (2013.01)

(58) Field of Classification Search
None
See application file for complete search history.

(56) References Cited

U.S. PATENT DOCUMENTS

| 5,143,103 | A | * | 9/1992 | Basso | B08B 3/12 |
| | | | | | 134/1 |
| 5,653,247 | A | * | 8/1997 | Murakami | B08B 3/02 |
| | | | | | 134/102.3 |

* cited by examiner

*Primary Examiner* — Eric W Golightly
*Assistant Examiner* — Arlyn I Rivera-Cordero
(74) *Attorney, Agent, or Firm* — IPro, PLLC

(57) ABSTRACT

The present disclosure relates to a sub-frame cleaning and blow-drying device, comprising a rack, a water tank, a bottom lifting assembly, supporting assemblies, a top lifting assembly, a rotating assembly, an expanding and cleaning-off assembly and a blow-drying device. Expanding assemblies expand to be connected with vehicle body mounting holes, compressed air is blown into the vehicle body mounting holes by air outlets and is blown into a cavity of a sub-frame to clean off aluminum scraps and residual sand in the cavity of the sub-frame, the rotating assembly drives the expanding and cleaning-off assembly and the sub-frame to do rotation movement to perform secondary cleaning, so that the aluminum scraps and the sand remaining inside the cavity can be cleaned off, and the sub-frame cleaning and blow-drying device can be flexibly adjusted by a position adjusting assembly according to different types of sub-frames and is strong in universality.

10 Claims, 4 Drawing Sheets

SUB-FRAME CLEANING AND BLOW-DRYING DEVICE

CROSS-REFERENCE TO RELATED APPLICATION

The present application claims benefit of Chinese Patent Application No. 201910490312.8, entitled "Sub-Frame Cleaning and Blow-Drying Device", filed on Jun. 6, 2019, the contents of which are hereby incorporated by reference in their entirety.

TECHNICAL FIELD

The application relates to the technical field of cleaning after machining of sub-frames and, specifically, relates to a sub-frame cleaning and blow-drying device.

BACKGROUND

A sub-frame is one of important parts on an automobile and is generally made of steel serving as a traditional material, and with the development of a manufacturing technology, an aluminum alloy sub-frame gradually replaces a steel sub-frame. At present, a relatively popular sub-frame is manufactured by mixed tailor-welding of an aluminum profile and an aluminum alloy casting, a complex part such as a vehicle body mounting point of the sub-frame is cast to be hollow, and a simple part such as a connecting beam is manufactured by tailor-welding after profile extrusion. There is a certain difficulty in cleaning the machined sub-frame, the casting is cast to be hollow, and thus, residual sand and aluminum scraps generated by machining can remain in a hollow cavity and are not easy to remove.

SUMMARY

The embodiment of the present disclosure provides a sub-frame cleaning and blow-drying device capable of solving problems existing in the background art, cleaning the aluminum scraps and sand remaining in a cavity and realizing flexible adjustment according to different types of sub-frames, strong in universality and high in practical value.

In order to achieve the aim, the present disclosure provides the following technical solution:

In the first aspect of the present disclosure provides a sub-frame cleaning device, comprising a rack, a water tank, a bottom lifting assembly, supporting assemblies, a top lifting assembly, a rotating assembly and an expanding and cleaning-off assembly, wherein the water tank is arranged at the bottom of the rack and is filled with a cleaning solution; the bottom lifting assembly is fixedly arranged on the bottom surface of the rack and is located in the water tank; the bottom lifting assembly is capable of driving the supporting assemblies on the bottom lifting assembly to move up and down in a vertical direction; the supporting assemblies are used for accommodating a sub-frame, there are four supporting assemblies, the supporting assemblies are arranged on the bottom lifting assembly and are respectively arranged at vehicle body mounting holes in the sub-frame, and the lower end surfaces of the vehicle body mounting holes are tightly attached to the upper surfaces of the supporting assemblies; the top lifting assembly is fixedly arranged at the top of the rack, the rotating assembly is fixedly arranged under the top lifting assembly, the expanding and cleaning-off assembly is fixedly arranged under the rotating assembly, and the top lifting assembly is capable of driving the rotating assembly on the top lifting assembly and the expanding and cleaning-off assembly to move up and down in the vertical direction; the rotating assembly is capable of driving the expanding and cleaning-off assembly located under the rotating assembly to rotate; the expanding and cleaning-off assembly comprises four expanding assemblies, an air compressor and a position adjusting assembly; the position adjusting assembly is arranged at the bottom of the rotating assembly and is used for adjusting the positions of the four expanding assemblies to ensure that the four expanding assemblies are in one-to-one correspondence to the vehicle body mounting holes in the sub-frame in position; the expanding assemblies are capable of deforming to expand to be fixed to the inner walls of the vehicle body mounting holes or restoring to be separated from the inner walls of the vehicle body mounting holes; air outlets are formed in the lower ends of the expanding assemblies, compressed air ports are arranged inside the expanding assemblies, the air compressor is connected with the compressed air ports by compressed air pipelines, the compressed air ports communicate with the air outlets, and compressed air may be blown into the vehicle body mounting holes through the air outlets and may be blown into a cavity of the sub-frame to clean off aluminum scraps and residual sand in the cavity of the sub-frame. in the technical solution, expanding assemblies expand to be connected with vehicle body mounting holes, compressed air is blown into the vehicle body mounting holes by air outlets and is blown into a cavity of a sub-frame to clean off aluminum scraps and sand remaining in the cavity of the sub-frame, a rotating assembly drives an expanding and cleaning-off assembly and the sub-frame to do rotation movement to perform secondary cleaning, so that the aluminum scraps and the sand remaining inside the cavity can be cleaned off, and the sub-frame cleaning and blow-drying device can be flexibly adjusted by a position adjusting assembly according to different types of sub-frames and is strong in universality.

In some embodiments, wherein the expanding assemblies comprise sleeves, inner air cylinders, the compressed air ports, expanding sleeves and expanding cores; the expanding sleeves are fixedly arranged at the bottoms of the sleeves, the side walls of the expanding sleeves have elasticity, the inner air cylinders are fixedly arranged at the inner tops of the sleeves, the expanding cores are fixedly arranged on piston rods of the inner air cylinders, are matched with the expanding sleeves and are stuffed into the expanding sleeves under the actions of the inner air cylinders, the expanding sleeves expand to be fixed to the inner walls of the vehicle body mounting holes, the expanding cores are removed out of the expanding sleeves under the actions of the inner air cylinders, and the expanding sleeves are restored and are separated from the inner walls of the vehicle body mounting holes; and the air outlets are formed in the expanding cores, the compressed air ports are fixedly arranged in the expanding cores, and the compressed air ports communicate with the air outlets. In the technical solution, expansion is realized by coordination of elastic expanding sleeves and expanding cores capable of moving up and down, and the sub-frame cleaning and blow-drying device is simple in structure and strong in universality.

In some embodiments, wherein the position adjusting assembly comprises a front adjusting part and a rear adjusting part, the front adjusting part comprises a left part and a right part, and the rear adjusting part comprises a left part and a right part; the left part and the right part of the front adjusting part share the same guide rail, the lower parts of the left part and the right part of the front adjusting part are each provided with an expanding assembly, and both the left part and the right part of the front adjusting part are capable of realizing left-right adjustment; and the left part and the right part of the rear adjusting part each comprise a left-right adjusting guide rail, a front-rear adjusting guide rail and an up-down adjusting guide rail, the lower parts of the left part and the right part of the rear adjusting part are each provided with an expanding assembly, and both the left part and the right part of the rear adjusting part are capable of realizing left-right adjustment, front-rear adjustment and up-down adjustment. In the embodiment, the position adjusting assembly comprises a front adjusting part and a rear adjusting part, the front adjusting part is capable of realizing left-right adjustment, the rear adjusting part is capable of realizing up-down, left-right and front-rear adjustment, the position adjusting assembly meets a requirement of adjusting the positions of the expanding assemblies in an actual cleaning-off process and is capable of conveniently adjusting positions and realizing flexible adjustment according to different types of sub-frames, thus being strong in universality.

In some embodiments, wherein the front adjusting assembly comprises front guide rails, a left slide block, a right slide block, a first support frame, a second support frame, a left air cylinder and a right air cylinder; the front guide rails are transversely and fixedly arranged in front of the bottom surface of the rotating assembly, the left and right sides of the front guide rails are respectively provided with the first support frame and the second support frame, the left air cylinder is fixedly arranged on the first support frame, the right air cylinder is fixedly arranged on the second support frame, both the left slide block and the right slide block are arranged on the front guide rails, a piston rod of the left air cylinder is fixedly connected with the left side of the left slide block, a piston rod of the right air cylinder is fixedly connected with the right side of the right slide block, the left slide block is capable of moving left and right along the front guide rails under the action of the left air cylinder, and the right slide block is capable of moving left and right along the front guide rails under the action of the right air cylinder; and the bottom surfaces of both the left slide block and the right slide block are fixedly provided with the expanding assemblies. In the technical solution, the front adjusting assembly is capable of moving left and right to adjust the left and right expanding assemblies at the front side to proper positions, and due to the adoption of the structural design, the front adjusting assembly is simple and practical and high in adjusting efficiency.

In some embodiments, wherein the rear adjusting assembly comprises first rear guide rails, a first rear slide block, a second rear air cylinder, second rear guide rails, a second rear slide block, a first rear sleeve, a fifth rear air cylinder, fifth rear guide rails, a fifth rear slide block, a first rear air cylinder, third rear guide rails, a third rear slide block, fourth rear guide rails, a fourth rear slide block, a fourth rear air cylinder, a second rear sleeve, a sixth rear air cylinder, sixth rear guide rails, a sixth rear slide block and a third rear air cylinder; the first rear guide rails and the third rear guide rails are fixedly arranged at the left and right sides of the bottom surface of the rotating assembly in a way of being perpendicular to the front guide rails, the bottom surface of the rotating assembly at the front ends of the first rear guide rails is fixedly provided with a third support frame, the third support frame is fixedly provided with the first rear air cylinder, the first rear slide block is arranged on the first rear guide rails, and a piston rod of the first rear air cylinder is fixedly arranged at the front side of the first rear slide block; the bottom surface of the rotating assembly at the front ends of the third rear guide rails is fixedly provided with a fourth support frame, the fourth support frame is fixedly provided with the third rear air cylinder, the third rear slide block is arranged on the third rear guide rails, and a piston rod of the third rear air cylinder is fixedly arranged at the front side of the third rear slide block; the bottom surface of the first rear slide block is fixedly provided with the second rear guide rails parallel to the front guide rails, the second rear slide block is arranged on the second rear guide rails, the right edge of the bottom surface of the first rear slide block is fixedly provided with a fifth support frame, the second rear air cylinder is fixedly arranged on the fifth support frame, a piston rod of the second rear air cylinder is fixedly arranged at the right side of the second rear slide block and is capable of pushing the second rear slide block to move left and right on the second rear guide rails; the bottom surface of the third rear slide block is fixedly provided with the fourth rear guide rails parallel to the front guide rails, the fourth rear slide block is arranged on the fourth rear guide rails, the left edge of the bottom surface of the third rear slide block is fixedly provided with a sixth support frame, the fourth rear air cylinder is fixedly arranged on the sixth support frame, and a piston rod of the fourth rear air cylinder is fixedly arranged at the left side of the fourth rear slide block and is capable of pushing the fourth rear slide block to move left and right on the fourth rear guide rails; the bottom surface of the second rear slide block is fixedly provided with the first rear sleeve and the fifth rear air cylinder, the fifth rear air cylinder is located in the first rear sleeve, the inner wall of the first rear sleeve is further provided with the vertical fifth rear guide rails, one end of the fifth rear slide block is fixedly arranged on the corresponding expanding assembly, the other end of the fifth rear slide block is arranged on the fifth rear guide rails, a piston rod of the fifth rear air cylinder is fixedly arranged on the upper surface of the top of the sleeve of the expanding assembly and pushes the expanding assembly to vertically move up and down along the fifth rear guide rails; and the bottom surface of the fourth rear slide block is fixedly provided with the second rear sleeve and the sixth rear air cylinder, the sixth rear air cylinder is located in the second rear sleeve, the inner wall of the second first rear sleeves further provided with the vertical sixth rear guide rails, one end of the sixth rear slide block is fixedly arranged on the corresponding expanding assembly, the other end of the sixth rear slide block is arranged on the sixth rear guide rails, and a piston rod of the sixth rear air cylinder is fixedly arranged on the upper surface of the top of the sleeve of the expanding assembly and pushes the expanding assembly to vertically move up and down along the sixth rear guide rails. In the embodiment, the rear adjusting assembly is capable of realizing up-down, front-rear and left-right adjustment of the two expanding assemblies at the rear side under the actions of air cylinders and ensuring that the two expanding assemblies at the rear side can also be accurately located under the condition that the two expanding assemblies at the front side are accurately located, and due to the adoption of the design, the rear adjusting assembly is convenient for adjusting and strong in practicability.

In some embodiments, further comprising blow-drying assemblies, the blow-drying assemblies being arranged on the rack located above the water tank and being used for blowing air towards the sub-frame. Blow-drying assemblies can comprise air compressors and air blowing ports, four side walls of the rack are respectively provided with the air compressors, the air compressors are connected with the air blowing ports, the air blowing ports blow towards the surface of the sub-frame, and the aim of blow-drying the sub-frame is achieved due to the design of the blow-drying assemblies.

In some embodiments, wherein the bottom lifting assembly comprises a first air cylinder, a first lifting platform, vertical guide rails and slide blocks, the lower end of the first air cylinder is fixedly arranged at the inner bottom of the water tank, the upper end of a piston rod of the first air cylinder is fixedly arranged on the bottom surface of the first lifting platform, and the left and right sides of the first lifting platform are fixedly provided with the slide blocks; and the piston rod of the first air cylinder drives the first lifting platform to vertically move up and down, and the slide blocks at the left and right sides of the first lifting platform move up and down along the vertical guide rails. The lifting assemblies in the embodiment can drive the supporting assemblies on the lifting assemblies and the sub-frame to move up and down to immerse the sub-frame into a cleaning solution for cleaning, in addition, vertical guide rails and slide blocks are arranged to be matched to guarantee the vertical lifting of the lifting assemblies, and a first lifting platform is always horizontal so that the phenomenon that the first lifting platform is deflected to result in position change of the sub-frame is avoided.

In some embodiments, wherein the supporting assemblies comprise supporting sleeves, springs and supporting platforms, the supporting sleeves are open in upper ends and closed in lower ends, the supporting platforms are located in the supporting sleeves, and the springs are arranged between the bottom surfaces of the supporting platforms and the bottoms of the supporting sleeves. Due to the design of supporting assemblies in the embodiment, supporting platforms slide downwards along inner walls of supporting sleeves under the gravity action of the sub-frame, springs are compressed, and the lower end surfaces of the vehicle body mounting holes are tightly attached to the upper surfaces of the supporting platforms, so that the aim of sealing the end surfaces is achieved while end surface location is realized.

In some embodiments, wherein the top lifting assembly comprises second air cylinders, a second lifting platform, guide sleeves and guide posts, the upper ends of the second air cylinders are fixedly arranged at the top of the rack, and piston rods of the second air cylinders are downwards and fixedly arranged on the top surface of the second lifting platform; through holes are formed in the left and right sides of the second lifting platform, the guide sleeves are arranged in the through holes, and the guide posts at the left and right sides of the rack are sleeved by the guide sleeves; and the piston rods of the second air cylinders drive the second lifting platform to vertically move up and down, and the guide sleeves move up and down along the guide posts. A top lifting assembly in the embodiment realizes lifting by virtue of up-down movement of a second lifting platform, driven by left and right air cylinders, and meanwhile, guide sleeves and guide posts are arranged to be matched, so that the difficulty in locating an expanding and cleaning-off assembly due to lifting inclination is avoided.

In some embodiments, wherein the rotating assembly comprises a servo motor, a bearing, a rotating shaft, a bearing block and a rotating platform, a through hole is formed in the middle of the bottom surface of the top lifting assembly, the servo motor is fixedly arranged on the bottom surface of the top lifting assembly, an output shaft of the servo motor passes through the through hole in the bottom surface of the top lifting assembly and is fixedly connected to the rotating shaft, the bearing block is fixedly arranged around the through hole in the bottom surface of the top lifting assembly, the bearing is fixedly arranged in the bearing block, and the rotating shaft penetrates through the bearing and the bearing block and is fixedly connected to the upper surface of the rotating platform. In the embodiment, a rotating assembly drives a rotating shaft to rotate by virtue of a servo motor, the rotating shaft drives a rotating platform to rotate, and the rotating assembly can drive the expanding and cleaning-off assembly located under the rotating assembly to rotate, so that the sub-frame in the cleaning solution is subjected to secondary cleaning.

Compared with the prior art, the present disclosure has the beneficial effects: the present disclosure provides the sub-frame cleaning and blow-drying device, the expanding assemblies expand to be connected with the vehicle body mounting holes, the compressed air is blown into the vehicle body mounting holes by air outlets and is blown into the cavity of the sub-frame to clean off the aluminum scraps and the residual sand in the cavity of the sub-frame, the rotating assembly drives the expanding and cleaning-off assembly and the sub-frame to do rotation movement to perform secondary cleaning, so that the aluminum scraps and the sand remaining inside the cavity can be cleaned off, and the sub-frame cleaning and blow-drying device can be flexibly adjusted by the position adjusting assembly according to the different types of sub-frames and is strong in universality. In addition, the blow-drying device is also arranged so that the cleaning solution remaining on the cleaned sub-frame can be blow-dried.

BRIEF DESCRIPTION OF THE DRAWINGS

In order to more clearly explain the technical solution in the embodiments of the present disclosure, drawings which require to be used in description of the embodiments are simply introduced below, obviously, the drawings in description below are some embodiments of the present disclosure, and those having ordinary skill in the art can further acquire other drawings without creative efforts according to those drawings.

Figure 1:
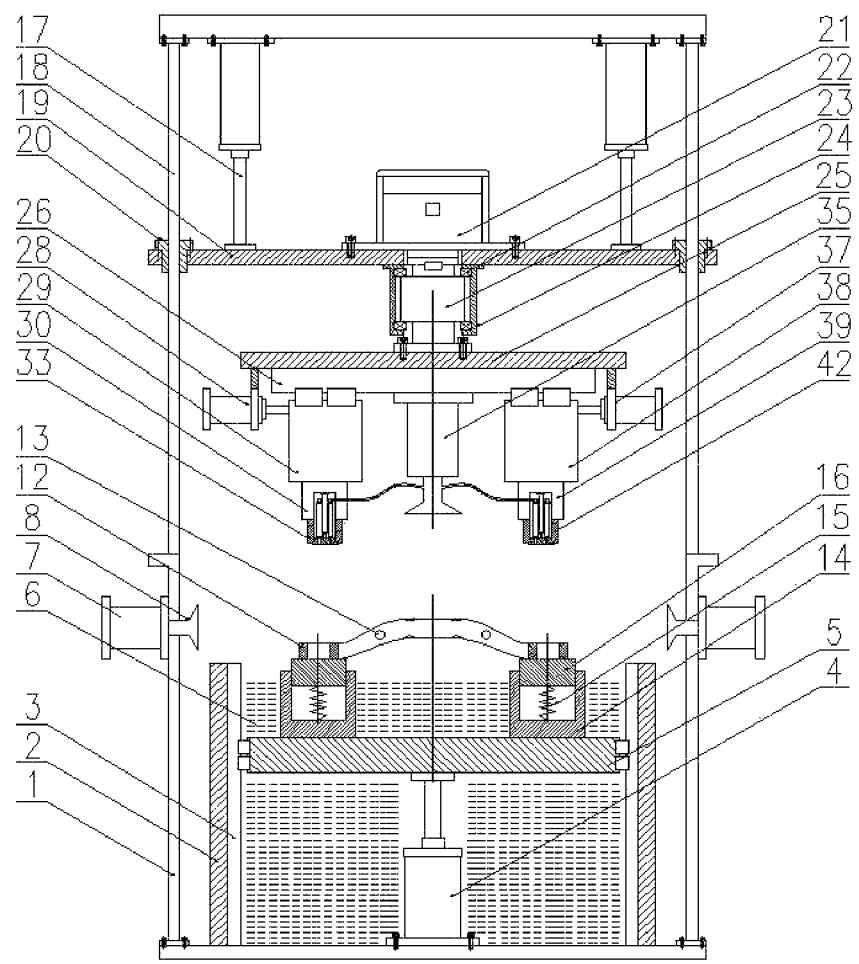
FIG. 1 illustrates a front view of a sub-frame cleaning and blow-drying device according to some embodiments of the present disclosure.
Figure 2:
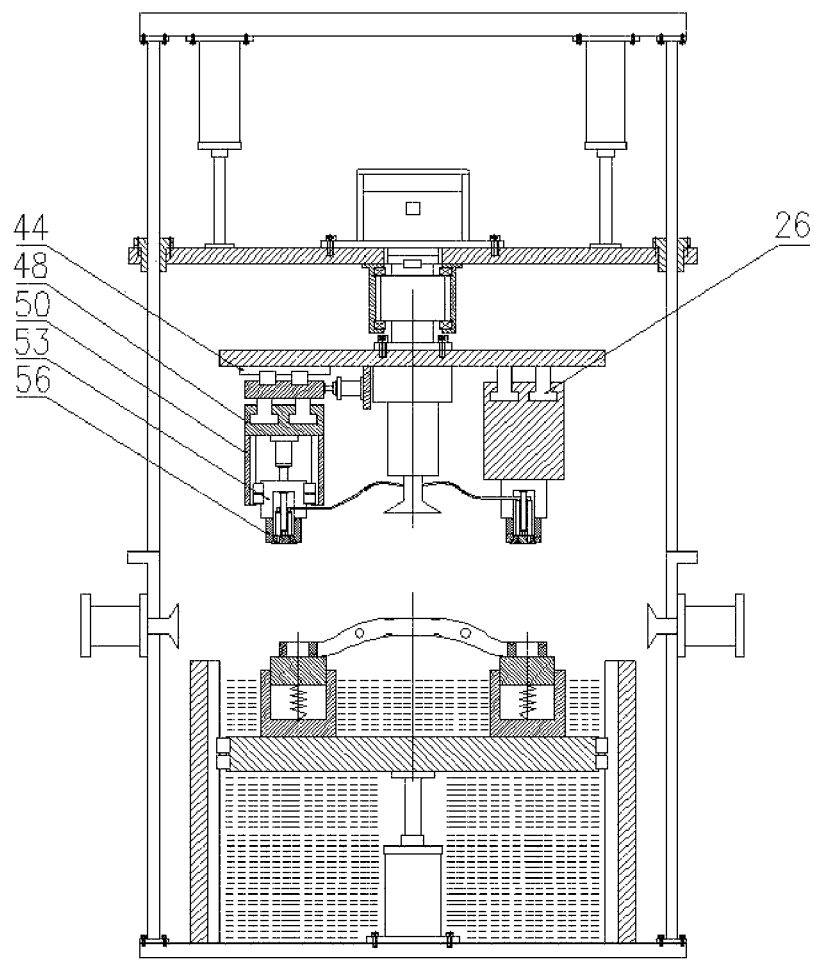
FIG. 2 illustrates a left view of a sub-frame cleaning and blow-drying device according to some embodiments of the present disclosure.

Reference numerals: 1—rack, 2—water tank, 3—vertical guide rail, 4—first air cylinder, 5—first lifting platform, 6—cleaning solution, 7—first air compressor, 8—air outlet, 9—second air compressor, 10—third air compressor, 11—fourth air compressor, 12—sub-frame, 13—sand clearing hole, 14—supporting sleeve, 15—spring, 16—supporting platform, 17—second air cylinder, 18—guide post, 19—second lifting platform, 20—guide sleeve, 21—servo motor, 22—bearing, 23—rotating shaft, 24—bearing block, 25—rotating platform, 26—front guide rail, 27—first support frame, 28—left air cylinder, 29—left slide block, 30—left sleeve, 31—first inner air cylinder, 32—first compressed air port, 33—first expanding sleeve, 34—first expanding core, 35—fifth air compressor, 36—second support frame, 37—right air cylinder, 38—right slide block, 39—right sleeve, 40—second inner air cylinder, 41—second compressed air port, 42—second expanding sleeve, 43—second expanding core, 44—first rear guide rail, 45—first rear air cylinder, 46—first rear slide block, 47—second rear guide rail, 48—second rear slide block, 49—second rear air cylinder, 50—first rear sleeve, 51—fifth rear guide rail, 52—fifth rear air cylinder, 53—fifth rear slide block, 54—third inner air cylinder, 55—third compressed air port, 56—third expanding sleeve, 57—third expanding core, 58—third rear guide rail, 59—third rear slide block, 60—fourth rear guide rail, 61—fourth rear slide block, 62—fourth rear air cylinder, 63—second rear sleeve, 64—sixth rear guide rail, 65—sixth rear air cylinder, 66—sixth rear slide block, 67—fourth inner air cylinder, 68—fourth compressed air port, 69—fourth expanding sleeve, 70—fourth expanding core.

DETAILED DESCRIPTION

The technical solution in the embodiments of the present disclosure is clearly and completely described in combination with drawings of the embodiments of the present disclosure below, and obviously, the described embodiments are part of embodiments of the present disclosure rather than all embodiments. Based on the embodiments of the present disclosure, all the other embodiments obtained by those having ordinary skill in the art without any creative works are within the protection scope of the present disclosure.

The terms 'first', 'second', 'third', 'fourth' and the like in the specification and in the claims of the present disclosure are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the present disclosure means that a particular feature, structure or characteristic described in connection with the embodiments is included in at least one embodiment of the present disclosure. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the present disclosure can be combined to other embodiments.

In order to further understand the content, features and functions of the disclosure, the following embodiments are given and illustrated with the attached drawings as follows.

Embodiment One

Embodiment One of the present disclosure is described below in combination with accompanying FIGS. 1-6.

A sub-frame cleaning and blow-drying device comprises a rack 1, a water tank 2, vertical guide rails 3, a first air cylinder 4, a first lifting platform 5, a cleaning solution 6, a first air compressor 7, air outlets 8, a second air compressor 9, a third air compressor 10, a fourth air compressor 11, a sub-frame 12, sand clearing holes 13, supporting sleeves 14, springs 15, supporting platforms 16, second air cylinders 17, guide posts 18, a second lifting platform 19, guide sleeves 20, a servo motor 21, a bearing 22, a rotating shaft 23, a bearing block 24, a rotating platform 25, front guide rails 26, a first support frame 27, a left air cylinder 28, a left slide block 29, a left sleeve 30, a first inner air cylinder 31, a first compressed air port 32, a first expanding sleeve 33, a first expanding core 34, a fifth air compressor 35, a second support frame 36, a right air cylinder 37, a right slide block 38, a right sleeve 39, a second inner air cylinder 40, a second compressed air port 41, a second expanding sleeve 42, a second expanding core 43, first rear guide rails 44, a first rear air cylinder 45, a first rear slide block 46, second rear guide rails 47, a second rear slide block 48, a second rear air cylinder 49, a first rear sleeve 50, fifth rear guide rails 51, a fifth rear air cylinder 52, a fifth rear slide block 53, a third inner air cylinder 54, a third compressed air port 55, a third expanding sleeve 56, a third expanding core 57, third rear guide rails 58, a third rear slide block 59, fourth rear guide rails 60, a fourth rear slide block 61, a fourth rear air cylinder 62, a second rear sleeve 63, sixth rear guide rails 64, a sixth rear air cylinder 65, a sixth rear slide block 66, a fourth inner air cylinder 67, a fourth compressed air port 68, a fourth expanding sleeve 69 and a fourth expanding core 70.

The water tank 2 is mounted inside the rack 1 and is full of the cleaning solution 6, the inner side wall of the water tank 2 is provided with the vertical guide rails 3, the first air cylinder 4 is fixedly arranged at the bottom of the water tank 2, the output end of the first air cylinder 4 is connected with the first lifting platform 5, the first lifting platform 5 is mounted on the vertical guide rails 3, and the first air cylinder 4 controls the first lifting platform 5 to move up and down under the guide actions of the vertical guide rails 3. The four supporting sleeves 14 are fixedly arranged on the first lifting platform 5, and the four supporting sleeves 14 are matched with and are in one-to-one correspondence to four vehicle body mounting holes in the sub-frame in position. The supporting platforms 16 are mounted in the supporting sleeves 14 and are used for locating the vertical end surface of the sub-frame, the outer walls of the supporting platforms 16 are matched with the inner walls of the supporting sleeves 14, and the bottoms of the supporting platforms 16 are connected with the supporting sleeves 14 by the springs 15. When the sub-frame is placed on the supporting platforms 16, the end surfaces of the four vehicle body mounting holes in the sub-frame fall onto the supporting platforms 16, the supporting platforms 16 slide downwards along the inner walls of the supporting sleeves 14 under the gravity action of the sub-frame, the springs 15 are compressed, and the lower end surfaces of the vehicle body mounting holes are tightly attached to the upper surfaces of the supporting platforms 16, so that the aim of sealing the end surfaces is achieved while end surface location is realized.

The four side walls of the rack 1 are respectively provided with the first air compressor 7, the second air compressor 9, the third air compressor 10 and the fourth air compressor 11, and the output end of each air compressor is provided with an air outlet.

The four guide posts 18 are mounted at the upper part of the rack 1, the second air cylinders 17 are fixedly arranged at the top of the rack 1, the output ends of the second air cylinders 17 are provided with the second lifting platform 19, the second lifting platform 19 is provided with the guide sleeves 20, the guide sleeves 20 are matched with the guide posts 18, and the second air cylinders 17 control the second lifting platform 19 to move up and down under the guide actions of the guide posts 18. The servo motor 21 is fixedly arranged on the second lifting platform 19, the output end of the servo motor 21 is connected with the rotating platform 25, the rotation of the rotating platform 25 can be controlled by the servo motor 21, and the fifth air compressor 35 is mounted in the center of a position below the rotating platform 25.

The bottom of the rotating platform 25 are provided with a front side region and a rear side region, the front side region is used to be matched with two vehicle body mounting holes in the front side of the sub-frame, and the rear side region is used to be matched with two vehicle body mounting holes in the rear side of the sub-frame. The front side region is that the two front guide rails 26 are fixedly arranged on the rotating platform 25, the first support frame 27 and the second support frame 36 are symmetrically mounted on the edge of the rotating platform 25, the left air cylinder 28 is mounted on the first support frame 27, and the right air cylinder 37 is mounted on the second support frame 36 in a manner that the left air cylinder 28 and the right air cylinder 37 are symmetrically arranged. The output end of the left air cylinder 28 is connected with the left slide block 29, the output end of the right air cylinder 37 is connected with the right slide block 38, and both the left slide block 29 and the right slide block 38 are mounted on the front guide rails 26. The left sleeve 30 is fixedly arranged on the left slide block 29, the first inner air cylinder 31 is fixedly arranged in the center of the interior of the left sleeve 30, the output end of the first inner air cylinder 31 is connected with the first expanding core 34 which is matched with the first expanding sleeve 33 and is provided with an air outlet connected with the first compressed air port 32, the first compressed air port 32 is connected with the output end of the fifth air compressor 35, and the fifth air compressor 35 provides compressed air for the air outlet in the first expanding core 34. The right sleeve 39 is fixedly arranged on the right slide block 38, the second inner air cylinder 40 is fixedly arranged in the center of the interior of the right sleeve 39, the output end of the second inner air cylinder 40 is connected with the second expanding core 43 which is matched with the second expanding sleeve 42 and is provided with an air outlet connected with the second compressed air port 41, the second compressed air port 41 is connected with the output end of the fifth air compressor 35, and the fifth air compressor 35 provides compressed air for the air outlet in the second expanding core 43. The rear side region is that the two first rear guide rails 44 are mounted at the left side of the rotating platform 25, the first rear slide block 46 is mounted on the first rear guide rails 44, the first rear air cylinder 45 is fixedly arranged on the rotating platform 25, the output end of the first rear air cylinder 45 is connected with the first rear slide block 46, and the first rear air cylinder 45 controls the first rear slide block 46 to move front and back under the guide actions of the first rear guide rails 44. The second rear guide rails 47 are fixedly arranged on the first rear slide block 46, the second rear slide block 48 is mounted on the second rear guide rails 47, the second rear air cylinder 49 is fixedly arranged on the first rear slide block 46, the output end of the second rear air cylinder 49 is connected with the second rear slide block 48, and the second rear air cylinder 49 controls the second rear slide block 48 to move left and right under the guide actions of the second rear guide rails 47. The first rear sleeve 50 is fixedly arranged on the second rear slide block 48, and the inner wall of the first rear sleeve 50 is provided with the fifth rear guide rails 51. The fifth rear air cylinder 52 is fixedly arranged on the second rear slide block 48, the output end of the fifth rear air cylinder 52 is connected with the fifth rear slide block 53, the fifth rear slide block 53 is mounted on the fifth rear guide rails 51, the fifth rear air cylinder 52 controls the fifth rear slide block 53 to move up and down under the guide actions of the fifth rear guide rails 51. The third inner air cylinder 54 is fixedly mounted in the fifth rear slide block 53, the output end of the third inner air cylinder 54 is connected with the third expanding core 57 which is matched with the third expanding sleeve 56 and is provided with an air outlet connected with the third compressed air port 55, the third compressed air port 55 is connected with the output end of the fifth air compressor 35, and the fifth air compressor 35 provides compressed air for the air outlet in the third expanding core 57. The two third rear guide rails 58 are mounted at the right side of the rotating platform 25, the third rear slide block 59 is mounted on the third rear guide rails 58, the third rear air cylinder is fixedly arranged on the rotating platform 25, the output end of the third rear air cylinder is connected with the third rear slide block 59, and the third rear air cylinder controls the third rear slide block 59 to move front and back under the guide actions of the third rear guide rails 58. The fourth rear guide rails 60 are fixedly arranged on the third rear slide block 59, the fourth rear slide block 61 is mounted on the fourth rear guide rails 60, the fourth rear air cylinder 62 is fixedly arranged on the third rear slide block 59, the output end of the fourth rear air cylinder 62 is connected with the fourth rear slide block 61, and the fourth rear air cylinder 62 controls the fourth rear slide block 61 to move left and right under the guide actions of the fourth rear guide rails 60. The second rear sleeve 63 is fixedly arranged on the fourth rear slide block 61, and the inner wall of the second rear sleeve 63 is provided with the sixth rear guide rails 64. The sixth rear air cylinder 65 is fixedly arranged on the fourth rear slide block 61, the output end of the sixth rear air cylinder 65 is connected with the sixth rear slide block 66, the sixth rear slide block 66 is mounted on the sixth rear guide rails 64, the sixth rear air cylinder 65 controls the sixth rear slide block 66 to move up and down under the guide actions of the sixth rear guide rails 64. The fourth inner air cylinder 67 is fixedly mounted inside the sixth rear slide block 66, the output end of the fourth inner air cylinder 67 is connected with the fourth expanding core 70 which is matched with the fourth expanding sleeve 69 and is provided with an air outlet connected with the fourth compressed air port 68, the fourth compressed air port 68 is connected with the output end of the fifth air compressor 35, and the fifth air compressor 35 provides compressed air for the air outlet in the fourth expanding core 70. During actual working, firstly, the positions of the first expanding sleeve 33 and the second expanding sleeve 42 are adjusted by the left air cylinder 28 and the right air cylinder 37, so that the two vehicle body mounting holes in the front end of the sub-frame are expanded by the first expanding sleeve 33 and the second expanding sleeve 42 in the front side region, based on the standard, then, the front-rear, left-right and up-down positions of the third expanding sleeve 56 are adjusted by the first rear air cylinder 45, the second rear air cylinder 49 and the fifth rear air cylinder 52, and the front-rear, left-right and up-down positions of the fourth expanding sleeve 69 are adjusted by the third rear air cylinder, the fourth rear air cylinder 62 and the sixth rear air cylinder 65, so that the two vehicle body mounting holes in the rear side of the sub-frame are expanded by the third expanding sleeve 56 and the fourth expanding sleeve 69 in the rear side region. The structure is capable of adapting to sub-frames having different widths, different heights and a height difference between the front vehicle body mounting holes and the rear vehicle body mounting holes and is extremely strong in universality.

A working process of the sub-frame cleaning and blow-drying device is that: firstly, the sub-frame 12 is grabbed by a manipulator and is placed on the supporting platforms 16, the end surfaces of the four vehicle body mounting holes in the sub-frame fall onto the supporting platforms 16, the supporting platforms 16 slide downwards along the inner walls of the supporting sleeves 14 under the gravity action of the sub-frame, the springs 15 are compressed, and the lower end surfaces of the vehicle body mounting holes are tightly attached to the upper surfaces of the supporting platforms 16, so that the aim of sealing the end surfaces is achieved while end surface location is realized. Then, the second air cylinder 17 is started to drive the second lifting platform 19 to move downwards so as to make the first expanding sleeve 33 and the second expanding sleeve 42 in the front side region enter the two vehicle body mounting holes in the front end of the sub-frame, then, the first inner air cylinder 31 and the second inner air cylinder 40 are started to ensure that the two vehicle body mounting holes in the front end of the sub-frame are expanded by the first expanding sleeve 33 and the second expanding sleeve 42, next, based on the standard, the front-rear, left-right and up-down positions of the third expanding sleeve 56 are adjusted by the first rear air cylinder 45, the second rear air cylinder 49 and the fifth rear air cylinder 52, and the front-rear, left-right and up-down positions of the fourth expanding sleeve 69 are adjusted by the third rear air cylinder, the fourth rear air cylinder 62 and the sixth rear air cylinder 65, so that the two vehicle body mounting holes in the rear side of the sub-frame are expanded by the third expanding sleeve 56 and the fourth expanding sleeve 69 in the rear side region, and then, the third inner air cylinder 54 and the fourth inner air cylinder 67 are started to ensure that the two vehicle body mounting holes in the rear side of the sub-frame are expanded by the third expanding sleeve 56 and the fourth expanding sleeve 69. At the moment, both the upper and lower end surfaces of the four vehicle body mounting holes in the sub-frame are in a sealed state, holes, leading to the inside of the cavity, in the vehicle body mounting holes are in an open state, next, the second air cylinder 17 and the first air cylinder 4 are synchronously started to drive the sub-frame to move downwards so as to immerse the sub-frame into the cleaning solution 6, and the cleaning solution 6 enters the cavity through holes such as the sand clearing holes 13 in the sub-frame. Next, the fifth air compressor 35 is started to output compressed air to the air outlets in the first expanding core 34, the second expanding core 43, the third expanding core 57 and the fourth expanding core 70, and the compressed air is blown towards the inside of the cavity of the sub-frame through the vehicle body mounting holes to clean off aluminum scraps and residual sand in the cavity of the sub-frame. After the cleaning is completed, the first air cylinder 4 drives the first lifting platform 5 to move downwards, and the vehicle body mounting holes in the sub-frame are expanded by the expanding sleeves, so that the sub-frame can be separated from the supporting platforms 16 and is in a hoisted state in the cleaning solution 6. Next, the servo motor 21 is started to drive the rotating platform 25 to rotate, so that the sub-frame does rotational movement in the cleaning solution 6, and furthermore, the aim of secondary cleaning is achieved. After rotational cleaning is completed, the second air cylinders 17 are started to drive the second lifting platform 19 to move upwards, so that the sub-frame is driven to be lifted to leave from a cleaning solution tank. Next, the first air compressor 7, the second air compressor 9, the third air compressor 10, the fourth air compressor 11 and the fifth air compressor 35 are simultaneously started to blow air towards the sub-frame through the air outlets, so that the aim of blow-drying is achieved. Next, the first air cylinder 4 is started again to drive the first lifting platform 5 to move upwards, so that the supporting platforms 16 are in contact with the sub-frame, next, the four expanding sleeves are loosened to make the sub-frame fall onto the supporting platforms 16, and finally, the first lifting platform 5 falls off to an initial state. Thus, the cleaning and blow-drying of the sub-frame are completed, feeding is performed after discharging performed by the manipulator, and the operation is repeated in such a way.

Embodiment Two

Embodiment Two of the present disclosure is described in combination with accompanying FIGS. 1-6: the sub-frame cleaning and blow-drying device comprises a rack 1, a water tank 2, a bottom lifting assembly, supporting assemblies, a top lifting assembly, a rotating assembly, an expanding and cleaning assembly and a blow-drying device.

The water tank 2 is arranged at the bottom of the rack 1 and is filled with a cleaning solution 6; the bottom lifting assembly is fixedly arranged on the bottom surface of the rack 1 and is located in the water tank 2; the bottom lifting assembly is capable of driving the supporting assemblies on the bottom lifting assembly to move up and down in a vertical direction; the bottom lifting assembly comprises a first air cylinder 4, a first lifting platform 5, vertical guide rails 3 and slide blocks, the lower end of the first air cylinder is fixedly arranged at the inner bottom of the water tank 2, the upper end of a piston rod of the first air cylinder is fixedly arranged on the bottom surface of the first lifting platform 5, and the left and right sides of the first lifting platform 5 are fixedly provided with the slide blocks; and the piston rod of the first air cylinder 4 drives the first lifting platform 5 to vertically move up and down, and the slide blocks at the left and right sides of the first lifting platform 5 move up and down along the vertical guide rails 3.

Figure 3:
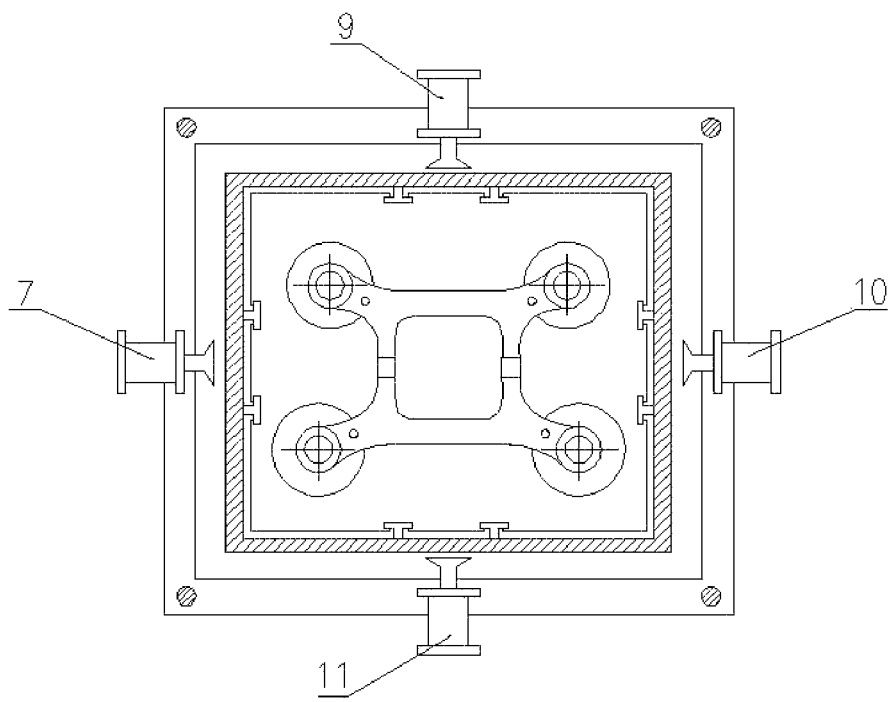
FIG. 3 illustrates a top view of a sub-frame cleaning and blow-drying device according to some embodiments of the present disclosure.
Figure 4:
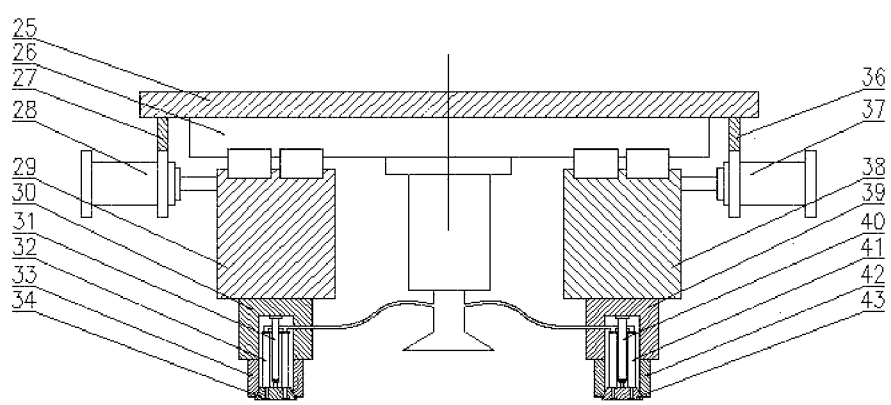
FIG. 4 illustrates a front view of an expanding and cleaning-off assembly of a sub-frame cleaning and blow-drying device according to some embodiments of the present disclosure.
Figure 5:
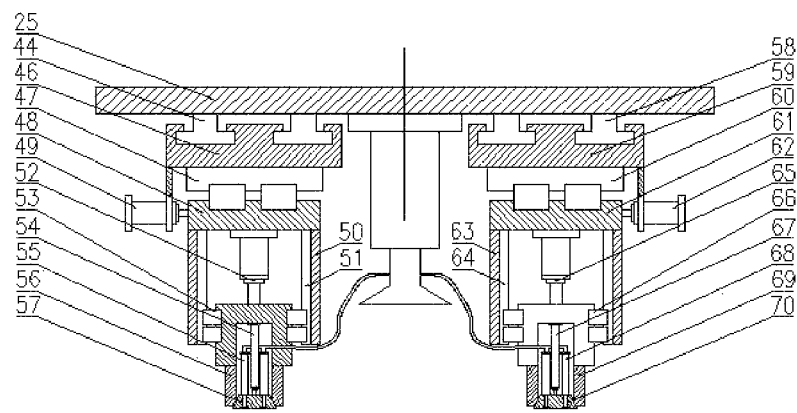
FIG. 5 illustrates a rear view of an expanding and cleaning-off assembly of a sub-frame cleaning and blow-drying device according to some embodiments of the present disclosure.
Figure 6:
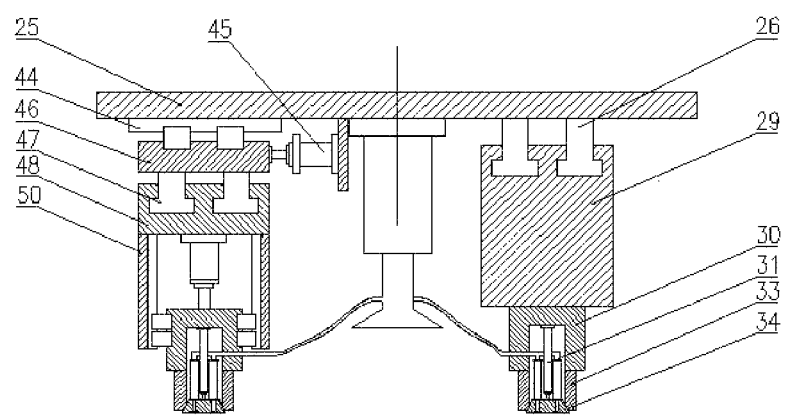
FIG. 6 illustrates a left view of an expanding and cleaning-off assembly of a sub-frame cleaning and blow-drying device according to some embodiments of the present disclosure.

Blow-drying assemblies are arranged on the rack 1 located above the water tank 2 and are used for blowing air towards a sub-frame. The blow-drying assemblies can comprise air compressors and air blowing ports, four side walls of the rack 1 are respectively provided with the air compressors, the air compressors are connected with the air blowing ports, the air blowing ports blow towards the surface of the sub-frame, and the aim of blow-drying the sub-frame is achieved due to the design of the blow-drying assemblies. As shown in FIG. 3, the four side walls of the rack 1 are respectively provided with a first air compressor 7, a second air compressor 9, a third air compressor 10 and a fourth air compressor 11, and the output end of each air compressor is provided with an air outlet.

The supporting assemblies are used for accommodating the sub-frame, there are four supporting assemblies, the supporting assemblies are arranged on the bottom lifting assembly and are respectively arranged at vehicle body mounting holes in the sub-frame, and the lower end surfaces of the vehicle body mounting holes are tightly attached to the upper surfaces of the supporting assemblies; and the supporting assemblies comprise supporting sleeves 14, springs 15 and supporting platforms 16, the supporting sleeves 14 are open in upper ends and closed in lower ends, the supporting platforms 16 are located in the supporting sleeves 14, and the springs 15 are arranged between the bottom surfaces of the supporting platforms 16 and the bottoms of the supporting sleeves 14.

The top lifting assembly is fixedly arranged at the top of the rack 1, the rotating assembly is fixedly arranged under the top lifting assembly, the expanding and cleaning-off assembly is fixedly arranged under the rotating assembly, and the top lifting assembly is capable of driving the rotating assembly on the top lifting assembly and the expanding and cleaning-off assembly to move up and down in the vertical direction; the top lifting assembly comprises second air cylinders 17, a second lifting platform 19, guide sleeves 20 and guide posts 18, the upper ends of the second air cylinders 17 are fixedly arranged at the top of the rack 1, and piston rods of the second air cylinders 17 are downwards and fixedly arranged on the top surface of the second lifting platform 19; through holes are formed in the left and right sides of the second lifting platform 19, the guide sleeves 20 are arranged in the through holes, and the guide posts 18 at the left and right sides of the rack 1 are sleeved by the guide sleeves 20; and the piston rods of the second air cylinders 17 drive the second lifting platform 19 to vertically move up and down, and the guide sleeves 20 move up and down along the guide posts 18.

The rotating assembly is capable of driving the expanding and cleaning-off assembly located under the rotating assembly to rotate; and the rotating assembly comprises a servo motor 21, a bearing 22, a rotating shaft 23, a bearing block 24 and a rotating platform 25, a through hole is formed in the middle of the second lifting platform 19, the servo motor 21 is fixedly arranged on the upper surface of the second lifting platform 19, an output shaft of the servo motor 21 passes through the through hole in the second lifting platform 19 and is fixedly connected to the rotating shaft 23, the bearing block 24 is fixedly arranged around the through hole in the second lifting platform 19, the bearing 22 is fixedly arranged in the bearing block 24, and the rotating shaft 23 penetrates through the bearing 22 and the bearing block 24 and is fixedly connected to the upper surface of the rotating platform 25.

The expanding and cleaning-off assembly comprises four expanding assemblies, a fifth air compressor 35 and a position adjusting assembly; the expanding assemblies comprise sleeves, inner air cylinders, compressed air ports, expanding sleeves and expanding cores; the expanding sleeves are fixedly arranged at the bottoms of the sleeves, the side walls of the expanding sleeves have elasticity, the inner air cylinders are fixedly arranged at the inner tops of the sleeves, the expanding cores are fixedly arranged on piston rods of the inner air cylinders, are matched with the expanding sleeves and are stuffed into the expanding sleeves under the actions of the inner air cylinders, the expanding sleeves expand to be fixed to the inner walls of the vehicle body mounting holes, the expanding cores are removed out of the expanding sleeves under the actions of the inner air cylinders, and the expanding sleeves are restored and are separated from the inner walls of the vehicle body mounting holes; and the air outlets are formed in the expanding cores, the compressed air ports are fixedly arranged in the expanding cores, and the compressed air ports communicate with the air outlets. The expanding assemblies are capable of deforming to expand to be fixed to the inner walls of the vehicle body mounting holes or restoring to be separated from the inner walls of the vehicle body mounting holes; the air outlets are formed in the lower ends of the expanding assemblies, the compressed air ports are arranged inside the expanding assemblies, the fifth air compressor 35 is connected with the compressed air ports by compressed air pipelines, the compressed air ports communicate with the air outlets, and compressed air may be blown into the vehicle body mounting holes through the air outlets and may be blown into the cavity of the sub-frame to clean off the aluminum scraps and the residual sand in the cavity of the sub-frame. The fifth air compressor 35 is fixedly arranged on a middle position on the bottom surface of the rotating platform of the rotating assembly.

The position adjusting assembly is arranged on the bottom surface of the rotating platform of the rotating assembly and is used for adjusting the positions of the four expanding assemblies to ensure that the four expanding assemblies are in one-to-one correspondence to the vehicle body mounting holes in the sub-frame in position. The position adjusting assembly comprises a front adjusting part and a rear adjusting part, the front adjusting part comprises a left part and a right part, and the rear adjusting part comprises a left part and a right part; the left part and the right part of the front adjusting part share the same guide rail, the lower parts of the left part and the right part of the front adjusting part are each provided with an expanding assembly, and both the left part and the right part of the front adjusting part are capable of realizing left-right adjustment; and the left part and the right part of the rear adjusting part each comprise left-right adjusting guide rails, front-rear adjusting guide rails and up-down adjusting guide rails, the lower parts of the left part and the right part of the rear adjusting part are each provided with an expanding assembly, and both the left part and the right part of the rear adjusting part are capable of realizing left-right adjustment, front-rear adjustment and up-down adjustment.

The front adjusting assembly comprises front guide rails 26, a left slide block 29, a right slide block 38, a first support frame 27, a second support frame 36, a left air cylinder 28 and a right air cylinder 37; the front guide rails 26 are transversely and fixedly arranged in front of the bottom surface of the rotating platform 25 of the rotating assembly, the left and right sides of the front guide rails 26 are respectively provided with the first support frame 27 and the second support frame 36, the left air cylinder 28 is fixedly arranged on the first support frame 27, the right air cylinder 37 is fixedly arranged on the second support frame 36, both the left slide block 29 and the right slide block 38 are arranged on the front guide rails 26, a piston rod of the left air cylinder 28 is fixedly connected with the left side of the left slide block 29, a piston rod of the right air cylinder 37 is fixedly connected with the right side of the right slide block 38, the left slide block 29 is capable of moving left and right along the front guide rails 26 under the action of the left air cylinder 28, and the right slide block 38 is capable of moving left and right along the front guide rails 26 under the action of the right air cylinder 37; and the bottom surfaces of both the left slide block 29 and the right slide block 38 are fixedly provided with the expanding assemblies. The rear adjusting assembly comprise first rear guide rails 44, a first rear slide block 46, a second rear air cylinder 49, second rear guide rails 47, a second rear slide block 48, a first rear sleeve 50, a fifth rear air cylinder 52, fifth rear guide rails 51, a fifth rear slide block 53, a first rear air cylinder 45, third rear guide rails 58, a third rear slide block 59, fourth rear guide rails 60, a fourth rear slide block 61, a fourth rear air cylinder 62, a second rear sleeve 63, a sixth rear air cylinder 65, sixth rear guide rails 64, a sixth rear slide block 66 and a third rear air cylinder (not shown in the figures and corresponding to the first rear air cylinder in position); the first rear guide rails 44 and the third rear guide rails 58 are fixedly arranged at the left and right sides of the bottom surface of the rotating assembly in a way of being perpendicular to the front guide rails, the bottom surface of the rotating assembly at the front ends of the first rear guide rails 44 is fixedly provided with a third support frame, the third support frame is fixedly provided with the first rear air cylinder 45, the first rear slide block 46 is arranged on the first rear guide rails 44, and a piston rod of the first rear air cylinder 45 is fixedly arranged at the front side of the first rear slide block 46; the bottom surface of the rotating assembly at the front ends of the third rear guide rails 58 is fixedly provided with a fourth support frame, the fourth support frame is fixedly provided with the third rear air cylinder, the third rear slide block 59 is arranged on the third rear guide rails 58, and a piston rod of the third rear air cylinder is fixedly arranged at the front side of the third rear slide block 59; the bottom surface of the first rear slide block is fixedly provided with the second rear guide rails 47 parallel to the front guide rails, the second rear slide block 48 is arranged on the second rear guide rails 47, the right edge of the bottom surface of the first rear slide block is fixedly provided with a fifth support frame, the second rear air cylinder 49 is fixedly arranged on the fifth support frame, a piston rod of the second rear air cylinder 49 is fixedly arranged at the right side of the second rear slide block 48 and is capable of pushing the second rear slide block 48 to move left and right on the second rear guide rails 47; the bottom surface of the third rear slide block 59 is fixedly provided with the fourth rear guide rails 60 parallel to the front guide rails, the fourth rear slide block 61 is arranged on the fourth rear guide rails 60, the left edge of the bottom surface of the third rear slide block 59 is fixedly provided with a sixth support frame, the fourth rear air cylinder 62 is fixedly arranged on the sixth support frame, and a piston rod of the fourth rear air cylinder 62 is fixedly arranged at the left side of the fourth rear slide block 61 and is capable of pushing the fourth rear slide block 61 to move left and right on the fourth rear guide rails 60; the bottom surface of the second rear slide block 48 is fixedly provided with the first rear sleeve 50 and the fifth rear air cylinder 52, the fifth rear air cylinder 52 is located in the first rear sleeve 50, the inner wall of the first rear sleeve 50 is further provided with the vertical fifth rear guide rails 51, one end of the fifth rear slide block 53 is fixedly arranged on the corresponding expanding assembly, the other end of the fifth rear slide block 53 is arranged on the fifth rear guide rails, a piston rod of the fifth rear air cylinder 52 is fixedly arranged on the upper surface of the top of the sleeve of the expanding assembly and pushes the expanding assembly to vertically move up and down along the fifth rear guide rails 51; and the bottom surface of the fourth rear slide block 61 is fixedly provided with the second rear sleeve 63 and the sixth rear air cylinder 65, the sixth rear air cylinder 65 is located in the second rear sleeve 63, the inner wall of the second rear sleeve 63 is further provided with the vertical sixth rear guide rails 64, one end of the sixth rear slide block 66 is fixedly arranged on one of the corresponding expanding assembly, the other end of the sixth rear slide block 66 is arranged on the sixth rear guide rails 64, and a piston rod of the sixth rear air cylinder 65 is fixedly arranged on the upper surface of the top of the sleeve of the corresponding expanding assembly and pushes the corresponding expanding assembly to vertically move up and down along the sixth rear guide rails 64.

A working process is that: firstly, a sub-frame 12 is grabbed by a manipulator and is placed on the supporting platforms 16, the end surfaces of the four vehicle body mounting holes in the sub-frame fall onto the supporting platforms 16, the supporting platforms 16 slide downwards along the inner walls of the supporting sleeves 14 under the gravity action of the sub-frame, the springs 15 are compressed, and the lower end surfaces of the vehicle body mounting holes are tightly attached to the upper surfaces of the supporting platforms 16, so that the aim of sealing the end surfaces is achieved while end surface location is realized. Then, the second air cylinder 17 is started to drive the second lifting platform 19 to move downwards so as to make the expanding assemblies in the front side region enter the two vehicle body mounting holes in the front end of the sub-frame, next, based on the standard, the front-rear, left-right and up-down positions of the two expanding assemblies in the rear side region are adjusted by the first rear air cylinder 45, the second rear air cylinder 49 and the fifth rear air cylinder 52 as well as the third rear air cylinder, the fourth rear air cylinder 62 and the sixth rear air cylinder 65, so that the two expanding assemblies in the rear side region enter and expand the two vehicle body mounting holes in the rear side of the sub-frame. At the moment, both the upper and lower end surfaces of the four vehicle body mounting holes in the sub-frame are in a sealed state, holes, leading to the inside of the cavity, in the vehicle body mounting holes are in an open state, next, the second air cylinder 17 and the first air cylinder 4 are synchronously started to drive the sub-frame to move downwards so as to immerse the sub-frame into the cleaning solution 6, and the cleaning solution 6 enters the cavity through holes such as the sand clearing holes 13 in the sub-frame. Next, the fifth air compressor 35 is started to output compressed air to the air outlets in the expanding assemblies, and the compressed air is blown towards the inside of the cavity of the sub-frame through the vehicle body mounting holes to clean off aluminum scraps and residual sand in the cavity of the sub-frame. After the cleaning is completed, the first air cylinder 4 drives the first lifting platform 5 to move downwards, and the vehicle body mounting holes in the sub-frame are expanded by the expanding sleeves, so that the sub-frame can be separated from the supporting platforms 16 and is in a hoisted state in the cleaning solution 6. Next, the servo motor 21 is started to drive the rotating platform 25 to rotate, so that the sub-frame does rotational movement in the cleaning solution 6, and furthermore, the aim of secondary cleaning is achieved. After rotational cleaning is completed, the second air cylinder 17 is started to drive the second lifting platform 19 to move upwards, so that the sub-frame is driven to be lifted to leave from a cleaning solution tank. Next, the first air compressor 7, the second air compressor 9, the third air compressor 10, the fourth air compressor 11 and the fifth air compressor 35 are simultaneously started to blow air towards the sub-frame through the air outlets, so that the aim of blow-drying is achieved. Next, the first air cylinder 4 is started again to drive the first lifting platform 5 to move upwards, so that the supporting platforms 16 are in contact with the sub-frame, next, the four expanding sleeves are loosened to make the sub-frame fall onto the supporting platforms 16, and finally, the first lifting platform 5 falls off to an initial state. Thus, the cleaning and blow-drying of the sub-frame are completed, feeding is performed after discharging performed by the manipulator, and the operation is repeated in such a way.

Based on the above, the present disclosure provides the sub-frame cleaning and blow-drying device comprising the rack, the water tank, the bottom lifting assembly, the supporting assemblies, the top lifting assembly, the rotating assembly, the expanding and cleaning-off assembly and the blow-drying device, the expanding assemblies expand to be connected to the vehicle body mounting holes, compressed air is blown into the vehicle body mounting holes by the air outlets and is blown into the cavity of the sub-frame to clean off aluminum scraps and residual sand in the cavity of the sub-frame, the rotating assembly drives the expanding and cleaning-off assembly and the sub-frame to do rotation movement to perform secondary cleaning, so that the aluminum scraps and the sand remaining inside the cavity can be cleaned off, and the sub-frame cleaning and blow-drying device can be flexibly adjusted by the position adjusting assembly according to different types of sub-frames and is strong in universality; in addition, the blow-drying device is also arranged so that a cleaning solution remaining on the cleaned sub-frame can be blow-dried. The device is capable of cleaning off the aluminum scraps and sand remaining in the cavity and realizing flexible adjustment according to different types of sub-frames, strong in universality, short in beat, high in efficiency and very high in actual present disclosure value.

The embodiments of the present disclosure are described in detail above, particular examples are used herein to explain the principle and embodiments of the present disclosure, and the above description of the embodiments is only used to help understanding the methods and core concept of the present disclosure; and meanwhile, for those having ordinary skill in the art, according to the idea of the present disclosure, there will be changes in the specific implementation mode and scope, in conclusion, the contents of the specification shall not be construed as a limitation of the present disclosure.

What is claimed is:

1. A sub-frame cleaning device, comprising:
   a rack,
   a water tank,
   a bottom lifting assembly,
   supporting assemblies,
   a top lifting assembly,
   a rotating assembly, and
   an expanding and cleaning-off assembly,
   wherein:
   the water tank is arranged at the bottom of the rack and is filled with a cleaning solution;
   the bottom lifting assembly is fixedly arranged on the bottom surface of the rack and is located in the water tank;
   the bottom lifting assembly is capable of driving the supporting assemblies on the bottom lifting assembly to move up and down in a vertical direction;
   the supporting assemblies are used for accommodating a sub-frame, there are four supporting assemblies, the supporting assemblies are arranged on the bottom lifting assembly and are respectively arranged at vehicle body mounting holes in the sub-frame, and the lower end surfaces of the vehicle body mounting holes are tightly attached to the upper surfaces of the supporting assemblies;
   the top lifting assembly is fixedly arranged at the top of the rack, the rotating assembly is fixedly arranged under the top lifting assembly, the expanding and cleaning-off assembly is fixedly arranged under the rotating assembly, and the top lifting assembly is capable of driving the rotating assembly on the top lifting assembly and the expanding and cleaning-off assembly to move up and down in the vertical direction; the rotating assembly is capable of driving the expanding and cleaning-off assembly located under the rotating assembly to rotate;
   the expanding and cleaning-off assembly comprises:
   four expanding assemblies,
   an air compressor, and
   a position adjusting assembly;
   the position adjusting assembly is arranged at the bottom of the rotating assembly and is used for adjusting the positions of the four expanding assemblies to ensure that the four expanding assemblies are in one-to-one correspondence to the vehicle body mounting holes in the sub-frame in position; and
   the expanding assemblies are capable of deforming to expand to be fixed to the inner walls of the vehicle body mounting holes or restoring to be separated from the inner walls of the vehicle body mounting holes; air outlets are formed in the lower ends of the expanding assemblies, compressed air ports are arranged inside the expanding assemblies, the air compressor is connected with the compressed air ports by compressed air pipelines, the compressed air ports communicate with the air outlets, and compressed air may be blown into the vehicle body mounting holes through the air outlets and may be blown into a cavity of the sub-frame to clean off aluminum scraps and residual sand in the cavity of the sub-frame.

2. The sub-frame cleaning device according to claim 1, wherein: the expanding assemblies comprise:
   sleeves,
   inner air cylinders,
   the compressed air ports,
   expanding sleeves, and
   expanding cores;
   the expanding sleeves are fixedly arranged at the bottoms of the sleeves, the side walls of the expanding sleeves have elasticity, the inner air cylinders are fixedly arranged at the inner tops of the sleeves, the expanding cores are fixedly arranged on piston rods of the inner air cylinders, are matched with the expanding sleeves and are stuffed into the expanding sleeves under the actions of the inner air cylinders, the expanding sleeves expand to be fixed to the inner walls of the vehicle body mounting holes, the expanding cores are removed out of the expanding sleeves under the actions of the inner air cylinders, and the expanding sleeves are restored and are separated from the inner walls of the vehicle body mounting holes; and
   the air outlets are formed in the expanding cores, the compressed air ports are fixedly arranged in the expanding cores, and the compressed air ports communicate with the air outlets.

3. The sub-frame cleaning device according to claim 1, further comprising: blow-drying assemblies, the blow-drying assemblies being arranged on the rack located above the water tank and being used for blowing air towards the sub-frame.

4. The sub-frame cleaning device according to any one of claim 1, wherein the bottom lifting assembly comprises:
   a first air cylinder,
   a first lifting platform,
   vertical guide rails, and
   slide blocks,
   the lower end of the first air cylinder is fixedly arranged at the inner bottom of the water tank, the upper end of a piston rod of the first air cylinder is fixedly arranged on the bottom surface of the first lifting platform, and the left and right sides of the first lifting platform are fixedly provided with the slide blocks; and the piston rod of the first air cylinder drives the first lifting platform to vertically move up and down, and the slide blocks at the left and right sides of the first lifting platform move up and down along the vertical guide rails.

5. The sub-frame cleaning device according to claim 1, wherein the supporting assemblies comprise:
supporting sleeves,
springs, and
supporting platforms,
the supporting sleeves are open in upper ends and closed in lower ends, the supporting platforms are located in the supporting sleeves, and the springs are arranged between the bottom surfaces of the supporting platforms and the bottoms of the supporting sleeves.

6. The sub-frame cleaning device according to claim 1, wherein the top lifting assembly comprises:
second air cylinders,
a second lifting platform,
guide sleeves, and
guide posts,
the upper ends of the second air cylinders are fixedly arranged at the top of the rack, and piston rods of the second air cylinders are downwards and fixedly arranged on the top surface of the second lifting platform;
through holes are formed in the left and right sides of the second lifting platform, the guide sleeves are arranged in the through holes, and the guide posts at the left and right sides of the rack are sleeved by the guide sleeves; and
the piston rods of the second air cylinders drive the second lifting platform to vertically move up and down, and the guide sleeves move up and down along the guide posts.

7. The sub-frame cleaning device according to claim 1, wherein the rotating assembly comprises:
a servo motor,
a bearing,
a rotating shaft,
a bearing block, and
a rotating platform,
a through hole is formed in the middle of the bottom surface of the top lifting assembly, the servo motor is fixedly arranged on the bottom surface of the top lifting assembly, an output shaft of the servo motor passes through the through hole in the bottom surface of the top lifting assembly and is fixedly connected to the rotating shaft, the bearing block is fixedly arranged around the through hole in the bottom surface of the top lifting assembly, the bearing is fixedly arranged in the bearing block, and the rotating shaft penetrates through the bearing and the bearing block and is fixedly connected to the upper surface of the rotating platform.

8. The sub-frame cleaning device according to claim 1, wherein the position adjusting assembly comprises: a front adjusting part and a rear adjusting part; the front adjusting part comprises: a left part and a right part; and the rear adjusting part comprises: a left part and a right part;
the left part and the right part of the front adjusting part share the same guide rail, the lower parts of the left part and the right part of the front adjusting part are each provided with an expanding assembly, and both the left part and the right part of the front adjusting part are capable of realizing left-right adjustment; and the left part and the right part of the rear adjusting part each comprise: a left-right adjusting guide rail, a front-rear adjusting guide rail and an up-down adjusting guide rail, the lower parts of the left part and the right part of the rear adjusting part are each provided with an expanding assembly, and both the left part and the right part of the rear adjusting part are capable of realizing left-right adjustment, front-rear adjustment and up-down adjustment.

9. The sub-frame cleaning device according to claim 8, wherein the front adjusting assembly comprises:
front guide rails,
a left slide block,
a right slide block,
a first support frame,
a second support frame,
a left air cylinder, and
a right air cylinder;
the front guide rails are transversely and fixedly arranged in front of the bottom surface of the rotating assembly, the left and right sides of the front guide rails are respectively provided with the first support frame and the second support frame, the left air cylinder is fixedly arranged on the first support frame, the right air cylinder is fixedly arranged on the second support frame, both the left slide block and the right slide block are arranged on the front guide rails, a piston rod of the left air cylinder is fixedly connected with the left side of the left slide block, a piston rod of the right air cylinder is fixedly connected with the right side of the right slide block, the left slide block is capable of moving left and right along the front guide rails under the action of the left air cylinder, and the right slide block is capable of moving left and right along the front guide rails under the action of the right air cylinder; and
the bottom surfaces of both the left slide block and the right slide block are fixedly provided with the expanding assemblies.

10. The sub-frame cleaning device according to claim 8, wherein the rear adjusting assembly comprises:
first rear guide rails,
a first rear slide block,
a second rear air cylinder,
second rear guide rails,
a second rear slide block,
a first rear sleeve,
a fifth rear air cylinder,
fifth rear guide rails,
a fifth rear slide block,
a first rear air cylinder,
third rear guide rails,
a third rear slide block,
fourth rear guide rails,
a fourth rear slide block,
a fourth rear air cylinder,
a second rear sleeve,
a sixth rear air cylinder,
sixth rear guide rails,
a sixth rear slide block, and
a third rear air cylinder;
the first rear guide rails and the third rear guide rails are fixedly arranged at the left and right sides of the bottom surface of the rotating assembly in a way of being perpendicular to the front guide rails, the bottom surface of the rotating assembly at the front ends of the first rear guide rails is fixedly provided with a third support frame, the third support frame is fixedly provided with the first rear air cylinder, the first rear slide block is arranged on the first rear guide rails, and a piston rod of the first rear air cylinder is fixedly arranged at the front side of the first rear slide block;

the bottom surface of the rotating assembly at the front ends of the third rear guide rails is fixedly provided with a fourth support frame, the fourth support frame is fixedly provided with the third rear air cylinder, the third rear slide block is arranged on the third rear guide rails, and a piston rod of the third rear air cylinder is fixedly arranged at the front side of the third rear slide block; the bottom surface of the first rear slide block is fixedly provided with the second rear guide rails parallel to the front guide rails, the second rear slide block is arranged on the second rear guide rails, the right edge of the bottom surface of the first rear slide block is fixedly provided with a fifth support frame, the second rear air cylinder is fixedly arranged on the fifth support frame, a piston rod of the second rear air cylinder is fixedly arranged at the right side of the second rear slide block and is capable of pushing the second rear slide block to move left and right on the second rear guide rails;

the bottom surface of the third rear slide block is fixedly provided with the fourth rear guide rails parallel to the front guide rails, the fourth rear slide block is arranged on the fourth rear guide rails, the left edge of the bottom surface of the third rear slide block is fixedly provided with a sixth support frame, the fourth rear air cylinder is fixedly arranged on the sixth support frame, and a piston rod of the fourth rear air cylinder is fixedly arranged at the left side of the fourth rear slide block and is capable of pushing the fourth rear slide block to move left and right on the fourth rear guide rails; the bottom surface of the second rear slide block is fixedly provided with the first rear sleeve and the fifth rear air cylinder, the fifth rear air cylinder is located in the first rear sleeve, the inner wall of the first rear sleeve is further provided with the vertical fifth rear guide rails, one end of the fifth rear slide block is fixedly arranged on the corresponding expanding assembly, the other end of the fifth rear slide block is arranged on the fifth rear guide rails, a piston rod of the fifth rear air cylinder is fixedly arranged on the upper surface of the top of the sleeve of the expanding assembly and pushes the expanding assembly to vertically move up and down along the fifth rear guide rails; and the bottom surface of the fourth rear slide block is fixedly provided with the second rear sleeve and the sixth rear air cylinder, the sixth rear air cylinder is located in the second rear sleeve, the inner wall of the second first rear sleeves further provided with the vertical sixth rear guide rails, one end of the sixth rear slide block is fixedly arranged on the corresponding expanding assembly, the other end of the sixth rear slide block is arranged on the sixth rear guide rails, and a piston rod of the sixth rear air cylinder is fixedly arranged on the upper surface of the top of the sleeve of the expanding assembly and pushes the expanding assembly to vertically move up and down along the sixth rear guide rails.

* * * * *